(12) United States Patent
Kim et al.

(10) Patent No.: US 10,059,326 B2
(45) Date of Patent: Aug. 28, 2018

(54) METHOD OF CONTROLLING CHANGE OF TRAVELLING MODE OF HYBRID VEHICLE AND CONTROL APPARATUS THEREOF

(71) Applicant: Hyundai Motor Company, Seoul (KR)

(72) Inventors: Sang Joon Kim, Seoul (KR); Joonyoung Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 97 days.

(21) Appl. No.: 15/049,954

(22) Filed: Feb. 22, 2016

(65) Prior Publication Data

US 2017/0066431 A1 Mar. 9, 2017

(30) Foreign Application Priority Data

Sep. 3, 2015 (KR) .......................... 10-2015-0125025

(51) Int. Cl.
*B60W 10/02* (2006.01)
*B60W 10/06* (2006.01)
(Continued)

(52) U.S. Cl.
CPC ............ *B60W 20/13* (2016.01); *B60W 10/02* (2013.01); *B60W 10/06* (2013.01); *B60W 10/08* (2013.01);
(Continued)

(58) Field of Classification Search
CPC ........... B60K 6/22; B60K 6/46; B60W 10/02; B60W 10/06; B60W 10/08; B60W 20/13; B60W 20/20; B60W 2510/244; B60W 2540/10; B60W 2710/021; B60W 2710/06; B60W 2710/08; B60Y 2200/92;
(Continued)

(56) References Cited

U.S. PATENT DOCUMENTS

2009/0240387 A1* 9/2009 Kawai ................... B60K 6/445
701/22
2013/0241485 A1* 9/2013 Snyder ................ B60L 11/1809
320/109
(Continued)

FOREIGN PATENT DOCUMENTS

JP 2011-079409 A 4/2011
JP 2013-133097 A 7/2013
(Continued)

*Primary Examiner* — Khoi H Tran
*Assistant Examiner* — Robert T Nguyen
(74) *Attorney, Agent, or Firm* — Mintz Levin Cohn Ferris Glovsky and Popeo, P.C.; Peter F. Corless (57) ABSTRACT

A method of controlling a change of a travelling mode of a hybrid vehicle is provided. The method includes calculating, by a controller, system required power required by a device mounted within a hybrid vehicle and calculating a reference power. A travelling mode of the hybrid vehicle is then changed from an electric vehicle (EV) mode to a hybrid electric vehicle (HEV) mode by operating an engine clutch to be connected when the system required power is greater than the reference power. The system required power is a value obtained by adding driver required power and power required by an auxiliary load device of the hybrid vehicle, and the reference power is power when a state of charge (SOC) of the battery providing power to the device of the hybrid vehicle is maintained in a normal region.

8 Claims, 5 Drawing Sheets

(51) Int. Cl.
*B60W 10/08* (2006.01)
*B60W 20/13* (2016.01)
*B60W 20/20* (2016.01)
*B60K 6/22* (2007.10)
*B60K 6/46* (2007.10)
*B60K 6/48* (2007.10)
*B60W 20/00* (2016.01)

(52) U.S. Cl.
CPC ............... *B60W 20/20* (2013.01); *B60K 6/48* (2013.01); *B60K 2006/4825* (2013.01); *B60W 20/00* (2013.01); *B60W 2510/244* (2013.01); *B60W 2510/305* (2013.01); *B60W 2540/10* (2013.01); *B60W 2710/021* (2013.01); *B60W 2710/06* (2013.01); *B60W 2710/0666* (2013.01); *B60W 2710/08* (2013.01); *B60W 2710/083* (2013.01); *B60Y 2200/92* (2013.01); *Y02T 10/6221* (2013.01); *Y02T 10/6252* (2013.01); *Y02T 10/6286* (2013.01); *Y10S 903/904* (2013.01); *Y10S 903/93* (2013.01)

(58) Field of Classification Search
CPC .......... B60Y 2200/182; B60Y 2200/42; B60Y 2400/61; B60Y 2400/88; B60Y 2200/43; B60Y 2200/60; Y10S 903/904; Y10S 903/93

See application file for complete search history.

(56) References Cited

U.S. PATENT DOCUMENTS

| 2014/0081490 | A1* | 3/2014 | Adelman | B60K 6/28 701/22 |
| 2014/0194246 | A1* | 7/2014 | Ueda | B60K 6/442 477/5 |
| 2014/0200763 | A1* | 7/2014 | Sisk | B60W 10/24 701/36 |
| 2015/0119189 | A1* | 4/2015 | Okubo | B60W 10/06 477/3 |
| 2015/0307086 | A1* | 10/2015 | Ketfi-Cherif | B60K 6/48 701/22 |
| 2015/0336572 | A1* | 11/2015 | Makimura | F02D 29/02 701/22 |

FOREIGN PATENT DOCUMENTS

| JP | 2014-111444 A | 6/2014 |
| JP | 2014-121963 A | 7/2014 |

* cited by examiner

FIG. 5

METHOD OF CONTROLLING CHANGE OF TRAVELLING MODE OF HYBRID VEHICLE AND CONTROL APPARATUS THEREOF

CROSS-REFERENCE TO RELATED APPLICATION

This application claims priority to and the benefit of Korean Patent Application No. 10-2015-0125025 filed in the Korean Intellectual Property Office on Sep. 3, 2015, the entire contents of which are incorporated herein by reference.

BACKGROUND (a) Field of the Invention

The present invention relates to a hybrid vehicle (hybrid electric vehicle), and more particularly, to a method of controlling a change of a travelling mode of a hybrid vehicle, and a control apparatus thereof.

(b) Description of the Related Art

An environmentally-friendly vehicle includes a fuel cell vehicle, an electric vehicle, a plug-in electric vehicle, and a hybrid vehicle, and generally includes a motor configured to generate driving power. A hybrid vehicle, which is an example of the environmentally-friendly vehicle, uses an internal combustion engine and battery power together. In other words, the hybrid vehicle efficiently combines and uses power of the internal combustion engine and power of the motor. The hybrid vehicle may include an engine, a motor, an engine clutch that regulates power between the engine and the motor, a transmission, a differential gear, a battery, a starter-generator configured to start the engine or generate power by output of the engine, and vehicle wheels.

Further, the hybrid vehicle may include a hybrid control unit configured to operate the hybrid vehicle, an engine control unit configured to operate the engine, a motor control unit configured to operate the motor, a transmission control unit configured to operate the transmission, and a battery control unit configured to operate and manage the battery. The battery control unit may be referred to as a battery management system. The starter-generator may be referred to as an integrated starter & generator (ISG) or a hybrid starter & generator (HSG). The hybrid vehicle may be operated in a travelling mode, such as an electric vehicle (EV) mode, which is a pure electric vehicle mode using power of the motor, a hybrid electric vehicle (HEV) mode, which uses rotatory power of the engine as main power and rotatory power of the motor as auxiliary power, and a regenerative braking mode, which collects braking and inertia energy through generation by the motor and charges a battery while the vehicle brakes or travels by inertia.

The above information disclosed in this section is merely for enhancement of understanding of the background of the invention and therefore it may contain information that does not form the prior art that is already known in this country to a person of ordinary skill in the art.

SUMMARY

The present invention provides a method of controlling a change of a travelling mode of a hybrid vehicle, capable of providing a determination method for entering a hybrid electric vehicle (HEV) mode, in which power of an engine is connected to a driving motor, and a control apparatus thereof.

An exemplary embodiment of the present invention provides a method of controlling a change of a travelling mode of a hybrid vehicle that may include: calculating, by a controller, system required power required by a device mounted within a hybrid vehicle; calculating, by the controller, reference power; and adjusting, by the controller, a travelling mode of the hybrid vehicle from an electric vehicle (EV) mode to a hybrid electric vehicle (HEV) mode by operating an engine clutch to be connected when the system required power is greater than the reference power, in which the system required power is a value obtained by adding driver required power and power required by an auxiliary load device of the hybrid vehicle, and the reference power is power when a state of charge (SOC) of the battery providing power to the device of the hybrid vehicle is maintained in a normal region.

The method may further include calculating, by the controller, the driver required power in response to an acceleration pedal amount signal output from an acceleration pedal sensor (APS) and calculating, by the controller, the driver required power in response to a cruise control request signal. The auxiliary load device may include a low voltage DC-DC converter, an air conditioner, or a heater. The power required by the auxiliary load device may be set by a value obtained by multiplying consumed power of the auxiliary load device by a weighting factor, and when the SOC of the battery is low, the weighting factor may be set to be large, and when the SOC of the battery is high, the weighting factor may be set to be minimal.

Another exemplary embodiment of the present invention provides a method of controlling a change of a travelling mode of a hybrid vehicle that may include: calculating, by a controller, system required power required by a device mounted within a hybrid vehicle; calculating, by the controller, reference power; and adjusting, by the controller, a travelling mode of the hybrid vehicle from an electric vehicle (EV) mode to a hybrid electric vehicle (HEV) mode by operating an engine clutch to be connected when the system required power is greater than the reference power, in which the system required power is a value obtained by adding driver required power and power required by an auxiliary load device of the hybrid vehicle.

In particular, the calculating of the reference power includes: setting, by the controller, power when a state of charge (SOC) of a battery providing power to the device of the hybrid vehicle is maintained in a normal region as first reference power; setting, by the controller, power when the SOC of the battery is maintained in the normal region within available power of a battery system including the battery as second reference power; setting, by the controller, power when the SOC of the battery is maintained in the normal region within available power of a motor system including a driving motor of the hybrid vehicle receiving power from the battery as third reference power; and setting, by the controller, a minimum value among the first reference power, the second reference power, and the third reference power as the reference power. When the SOC of the battery is low, the first reference power may be set to be minimal, and when the SOC of the battery is high, the first reference power may be set to be large.

Yet another exemplary embodiment of the present invention provides an apparatus for controlling a change of a travelling mode of a hybrid vehicle, the apparatus may include: an acceleration pedal sensor (APS) configured to detect a pedal amount (e.g., engagement amount) of an acceleration pedal; and a controller configured to calculate system required power that is a value obtained by adding driver required power required by a device mounted within a hybrid vehicle and power required by an auxiliary load device of the hybrid vehicle, and calculate reference power that is power when a state of charge (SOC) of a battery providing power to a system of the hybrid vehicle is maintained in a normal region, in which the controller may be configure to adjust a travelling mode of the hybrid vehicle from an electric vehicle (EV) mode to a hybrid electric vehicle (HEV) mode by operating an engine clutch to be connected in response to determining that the system required power is greater than the reference power, and the controller may be configured to calculate the driver required power in response to the acceleration pedal amount signal. The controller may further be configured to calculate the driver required power in response to a cruise control request signal. The auxiliary load device may include a low voltage direct current-direct current (DC-DC) converter, an air conditioner, or a heater.

Still yet another exemplary embodiment of the present invention provides an apparatus for controlling a change of a travelling mode of a hybrid vehicle that may include: an acceleration pedal sensor (APS) configured to detect a pedal engagement amount of an acceleration pedal; and a controller configured to calculate system required power that is a value obtained by adding driver required power required by a device mounted within a hybrid vehicle and power required by an auxiliary load device of the hybrid vehicle, and calculate reference power that is power when a state of charge (SOC) of a battery providing power to a system of the hybrid vehicle is maintained in a normal region, in which the controller may be configured to adjust a travelling mode of the hybrid vehicle from an electric vehicle (EV) mode to a hybrid electric vehicle (HEV) mode by operating an engine clutch to be connected in response to determining that the system required power is greater than the reference power, the controller may be configured to calculate the driver required power in response to the acceleration pedal amount signal.

Further, the controller may be configured to set power when a state of charge (SOC) of a battery providing power to the device of the hybrid vehicle is maintained in a normal region as first reference power, set power when the SOC of the battery is maintained in the normal region within available power of a battery system including the battery as second reference power, set power when the SOC of the battery is maintained in the normal region within available power of a motor system including a driving motor of the hybrid vehicle receiving power from the battery as third reference power, and set a minimum value among the first reference power, the second reference power, and the third reference power as the reference power. When the SOC of the battery is low, the first reference power may be set to be minimal, and when the SOC of the battery is high, the first reference power may be set to be large.

According to the exemplary embodiments of the present invention, the method and the apparatus for controlling the change of the travelling mode of the hybrid vehicle may determine a connection time of engine power (e.g., a time point of a change of a travelling mode from the EV mode to the HEV mode) based on system required power and an SOC of the battery, thereby effectively maintaining the SOC of the battery in the normal region. According to the exemplary embodiments of the present invention, energy efficiency may be improved compared to a method of using engine power for charging a battery in a state where an SOC of the battery is very low. The present invention may also increase fuel efficiency of a vehicle by the excellent efficiency.

BRIEF DESCRIPTION OF THE DRAWINGS

In order to more fully understand the drawings used in the detailed description of the present invention, a brief description of each drawing is provided.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In order to fully understand the present invention and an object achieve by the implementation of the present invention, the accompanying drawings exemplifying an exemplary embodiment of the present invention and contents described with reference to the accompanying drawings need to be referred to.

Hereinafter, the present invention will be described in detail by describing an exemplary embodiment of the present invention with reference to the accompanying drawings. In describing the present invention, when it is determined that detailed description relating to well-known functions or configurations may make the subject matter of the present disclosure unnecessarily ambiguous, the detailed description will be omitted. The same reference numerals presented in each drawing may represent the same constituent elements.

Terms used in the present specification are simply used for a specific exemplary embodiment, and are not intended to limit the present invention. Singular expressions used herein include plural expressions unless they have definitely opposite meanings. In the present specification, it will be appreciated that terms "including" and "having" are intended to designate the existence of characteristics, numbers, steps, operations, constituent elements, and components, or a combination thereof described in the specification, and do not exclude a possibility of the existence or addition of one or more other characteristics, numbers, steps, operations, constituent elements, and components, or a combination thereof in advance. Throughout the specification, when it is described that a part is "coupled" to another part, the part may be "electrically or mechanically coupled" to another part with a third part interposed therebetween, as well as "directly coupled" to another part.

Terms used herein including technical or scientific terms have the same meanings as meanings which are generally understood by those skilled in the art unless they are differently defined. Terms which are defined in a generally used dictionary should be interpreted to have the same meaning as the meaning in the context of the related art but are not to be interpreted as having an ideally or excessively formal meaning if it is not clearly defined in the present invention.

A hybrid vehicle may travel in an electric vehicle (EV) mode, in which the hybrid vehicle is operable by electric power, and a hybrid electric vehicle (HEV) mode, in which the vehicle is driven by using at least two kinds of power, such as engine power and electric power. Accordingly, a determination of a change from the EV mode to the HEV mode may be considerably important for operability and fuel efficiency of the hybrid vehicle.

In the related art, to determine a change from the EV mode to the HEV mode, a driver required torque (or required power of a driver, that is, a driver set, intended, or requested power) is monitored (or calculated), and when the driver required torque is equal to or greater than a predetermined reference value, the EV mode is changed into the HEV mode and engine power is connected to a driving shaft (or a driving wheel). The reference value for engine starting (engine connection) is set based on efficiency of the engine, and the engine is driven at a reference value or greater that is a torque when engine efficiency is sufficient. The reference value may be a driver required torque. The relevant technology has an advantage in being used in a method for connecting engine power (e.g., a method of transiting the EV mode to the HEV mode), and enabling the vehicle to travel at an operation point at which the engine efficiency is sufficient, but has a disadvantage in that management of a battery is not considered.

Figure 1:
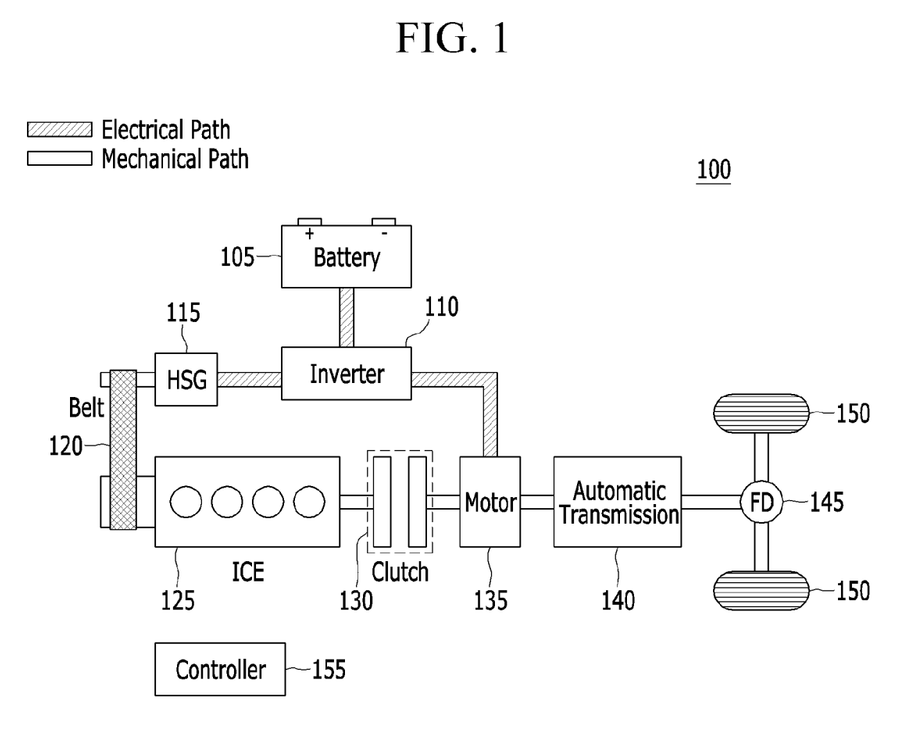
FIG. 1 is a diagram illustrating a hybrid vehicle including an apparatus for controlling a change of a travelling mode of a hybrid vehicle according to an exemplary embodiment of the present invention.

FIG. 1 is a diagram illustrating a hybrid vehicle including an apparatus for controlling a change of a travelling mode of a hybrid vehicle according to an exemplary embodiment of the present invention. Referring to FIG. 1, a hybrid vehicle 100 may include a battery 105, an inverter 110, a hybrid starter & generator (HSG) 115, a belt 120, an engine 125, an engine clutch 130, a motor (or a driving motor) 135, which may be an electric motor, a transmission 140, a final reduction gear device 145, driving wheels 150, which are vehicle wheels, and a controller 155.

The hybrid vehicle 100, which may be a hybrid electric vehicle, may use the engine 125 and the motor 135 as power sources, and may include the engine clutch 130 mounted between the motor and the engine 125 to allow the hybrid vehicle 100 to be operated in the EV mode, in which the hybrid vehicle 100 travels by the motor 135 when the engine clutch 130 is opened, and in the HEV mode, in which the hybrid vehicle 100 is capable of travelling by both the motor 135 and the engine 125 when the engine clutch 130 is closed.

The hybrid vehicle 100 may include a powertrain of a transmission mounted electric device (TMED) scheme, in which the motor 135 and the transmission 140 may be attached, and the engine clutch 130 may be mounted between the power sources including the engine 125 and the motor 135, to allow the hybrid vehicle 100 to provide an operation (travelling) in the EV mode that is a pure electric vehicle mode using power of the motor 130 or the HEV mode using rotatory power of the engine 125 as main power and rotatory power of the motor 135 as auxiliary power according to a connection (coupling) of the engine clutch 130. More particularly, in the hybrid vehicle 100 having a structure in which the motor 135 is directly connected with the transmission 140, an engine revolutions per minute (RPM) may be increased by starting the HSG 115, the power of the engine 125 may be transmitted and blocked by a connection (coupling) and a separation of the clutch 130, driving power may be generated in the wheels 150 by a power transmission system, which may include the transmission 140, and engine torque may be transmitted through the connection of the clutch 130 when a torque transmission is requested from the engine 125.

The battery 105, the inverter 110, the HSG 115, and the motor 135 may form an electrical path, and the HSG 115, the belt 120, the engine 125, the engine clutch 130, the motor 135, the transmission 140, the final reduction gear device 145, and the driving wheels 150 may form a mechanical path. The controller 155 may include a hybrid control unit (HCU), a motor control unit (MCU), an engine control unit (ECU) or an engine management system (EMS), and a transmission control unit (TCU).

In particular, the HCU may be configured to start the engine by operating the HSG 115 when the engine 125 stops. The HCU, which is a top level controller (e.g., an upper controller), may be configured to integrally operate the various other control units, such as the MCU, connected via a network, such as a vehicle network including a controller area network (CAN), and may be configured to execute a general operation of the hybrid vehicle 100. The MCU may be configured to operate the HSG 115 and the motor 135. The MCU may enable the driving motor 135 to be driven within a region having maximum efficiency by adjusting an output torque of the driving motor 135 based on a control signal output from the HCU via the network. The MCU may include the inverter 110 formed of a plurality of power switching devices, and the power switching device configuring the inverter 110 may be one of an insulated gate bipolar transistor (IGBT), a metal oxide semiconductor field effect transistor (MOSFET), a field effect transistor (PET), a transistor (TR), and a relay. The MCU may be disposed between the battery 105 and the motor 135.

Further, the ECU (EMS) may be configured to adjust a torque of the engine 125. The ECU (EMS) may enable an optimal torque to be output by adjusting an operation point of the engine 125 based on a control signal output from the HCU via the network. The TCU may be configured to operate the transmission 140. The controller 155 may be configured to calculate or determine system required power or system required torque required by a device or a system mounted within the hybrid vehicle 100, and calculate reference power or reference torque that is a reference value that corresponds to a travelling mode change time point of the hybrid vehicle illustrated in FIG. 2. The system required power may be a value obtained by adding driver required power or driver acceleration required power and power required by an auxiliary load device or an auxiliary load system of the hybrid vehicle 100.

The auxiliary load device may include a low voltage DC-DC converter (LDC), an air conditioner (A/C), or a heater, such as a heater ventilated air conditioning (HVAC) heater. The LDC may be configured to charge an auxiliary battery by converting a voltage of the battery 105 into a low voltage. The auxiliary battery may be, for example, a 12 volt battery, and may be a vehicle battery used for starting the vehicle or supplying power to various electric devices (electric/electronic loads) of the vehicle. The LDC may be configured to vary or adjust a voltage of the battery 105 to be appropriate to a voltage (e.g., about 12.5 V to 15.1 V) used in an electric/electronic load of the vehicle and supply power. The electric/electronic load may include a ventilating seat, a head lamp, an audio device, or a wiper. The reference power may be power when a state of charge (SOC) of the battery 105 supplying power to the device (e.g., the motor 135 or the auxiliary load device, such as the A/C) of the hybrid vehicle 100 is maintained in a normal region (e.g., about 50% or more and 80% or less).

In another exemplary embodiment of the present invention, a controller 155 may be configured to set power when an SOC of a battery 105 that provides power to a device of a hybrid vehicle 100 is maintained in a normal region as first reference power, power when the SOC of the battery 105 is maintained in the normal region within available power of a battery system including the battery 105 as second reference power, and power when the SOC of the battery 105 is maintained in the normal region within available power of a motor system including a driving motor 135 of the hybrid vehicle 100 configured to receive electric power from the battery 105 as third reference power. The controller 155 may further be configured to set or calculate a minimum value among the first reference power, the second reference power, and the third reference power as the reference power.

Additionally, the controller 155 may be configured to calculate driver required power in response to an acceleration pedal engagement amount signal output from an acceleration pedal sensor (an acceleration position sensor or acceleration pedal position sensor (APS)) (not illustrated) mounted within the hybrid vehicle 100. In other words, the APS may be configured to detect the amount of pressure exerted onto an accelerator pedal to determine an engagement amount of the pedal. The APS may be configured to detect an operation of an acceleration pedal by a driver, and provide the HCU included in the controller 155 with a signal based on operation power applied to the acceleration pedal. The APS may further be configured to detect a pedal engagement amount of the acceleration pedal engaged on by the driver during driving the vehicle. The apparatus for controlling a change of a travelling mode of the hybrid vehicle may include the APS and the controller 155.

In another exemplary embodiment of the present invention, the controller 155 may be configured to calculate the driver required power in response to a cruise control request signal. In response to determining that the system required power is greater than the reference power, the controller 155 may be configured to adjust or change a travelling mode of the hybrid vehicle 100 from the EV mode to the HEV mode by operating the engine clutch 130 to be coupled at the connection time of the engine illustrated in FIG. 2. The controller 155 may be, for example, one or more microprocessors operated by a program or hardware including the microprocessor, and the program may include a series of commands for performing a method of controlling a change of a travelling mode of a hybrid vehicle according to an exemplary embodiment of the present invention, which will be described below.

The battery 105 may be formed of a plurality of unit cells, and for example, a DC high voltage of about 350 V to 450 V for supplying a voltage to the driving motor 135 configured to provide driving power to the wheels 150 may be stored in the battery 105. The HSG 115 may be operated as a motor or a generator, and may be operated as a motor based on a control signal output from the MCU to start the engine 125, and operated as a generator when the engine 125 maintains the starting-on and configured to generate a voltage, and provide the generated voltage to the battery 105 as a charging voltage through the inverter 110. The HSG 115 may be connected to the engine 125 via the belt 120.

The engine 125 may include an internal combustion engine, for example, any one of a diesel engine, a gasoline engine, a liquefied petroleum gas (LPG) engine, and a liquefied natural gas (LNG) engine, and may be configured to output a torque at an operation point based on a control signal output from the ECU and appropriately maintain a combination of driving power with the driving motor 135 in the HEV mode. The engine clutch 130 may be mounted between the engine 125 and the driving motor 135, and may provide an operation in the EV mode and the HEV mode by intermitting power transmission (power connection). The driving motor 135 may be operated by a three-phase alternating current (AC) voltage output from the MCU to generate a torque, and may be operated as a generator during coasting to supply regenerative energy to the battery 105.

The transmission 140 may be implemented by a multiple speed transmission, such as an automatic transmission illustrated in FIG. 1 or a dual clutch transmission (DCT), or a continuously variable transmission (CVT), and a connection element and a release element may be operated by an operation of hydraulic pressure based on the control of the TCU, to connect a predetermined gear shift stage. The transmission 140 may be configured to transmit driving power of the engine 125 and/or the motor 135 to the wheels 150 or may be configured to block driving power of the engine 125 and/or the motor 135. The final reduction gear device 145 may be connected to a differential gear device (not illustrated).

As described above, the hybrid vehicle 100 may be configured to execute a change of a travelling mode from the EV mode to the HEV mode using system required power and a reference value based on an SOC of the battery to improve fuel efficiency of the vehicle.

Figure 2:
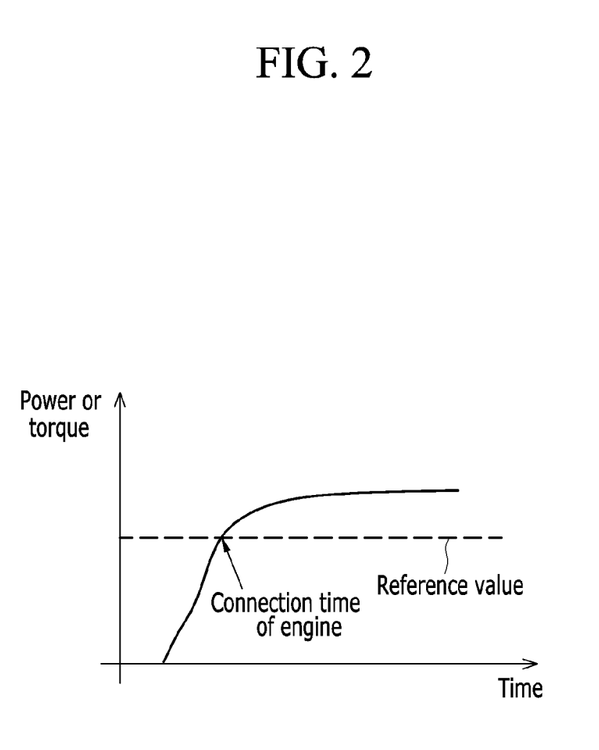
FIG. 2 is a graph illustrating a travelling mode change time point of the hybrid vehicle illustrated in FIG. 1 according to an exemplary embodiment of the present invention.

FIG. 2 is a graph illustrating a travelling mode change time point of the hybrid vehicle illustrated in FIG. 1. Referring to FIG. 2, a travelling mode of the hybrid vehicle 100 may be changed from the EV mode to the HEV mode at a connection time of the engine, at which engine power is connected. The engine power (or engine torque) compared with a reference value that corresponds to the connection time of the engine may be system required power (or system required torque). Driver required power included in the system required power may be power required by a driver based on an engagement degree of the accelerator pedal by the driver (e.g., the amount of pressure exerted onto the pedal) or a selection of cruise travel (or cruise control) by the driver. The engagement degree of the accelerator pedal by the driver may be related to an opening degree (open value) of a throttle valve. Power included in the system required power and required (used) by an auxiliary load device may be power required by a system based on the amount of energy consumed by an auxiliary load, such as an A/C.

As described above, the reference value that corresponds to the connection time of the engine may be power when an SOC of the battery 105 configured to provide power to the system of the hybrid vehicle 100 is maintained in the normal region. In the aforementioned related technology compared with the exemplary embodiment of the present invention, the reference value may be set by power of the engine when engine efficiency is best (e.g., at a maximum). Further, to change a travelling mode from the EV mode to the HEV mode, the engine power compared with the reference value may be the driver required power.

When the auxiliary load does not consume energy, the system required power is the same as the driver required power, and when the auxiliary load is turned on (e.g., the auxiliary load is operated), the system required power is increased, and thus, the present invention may first enter the HEV mode compared to the related technology. In the HEV mode, power may be distributed to maximize system efficiency. However, in the related technology, a travelling mode enters the HEV mode late (e.g., at a later point than the claimed invention), and the engine is inefficiently operated to improve an SOC of the battery, and thus, fuel efficiency of the vehicle may deteriorate.

Figure 3:
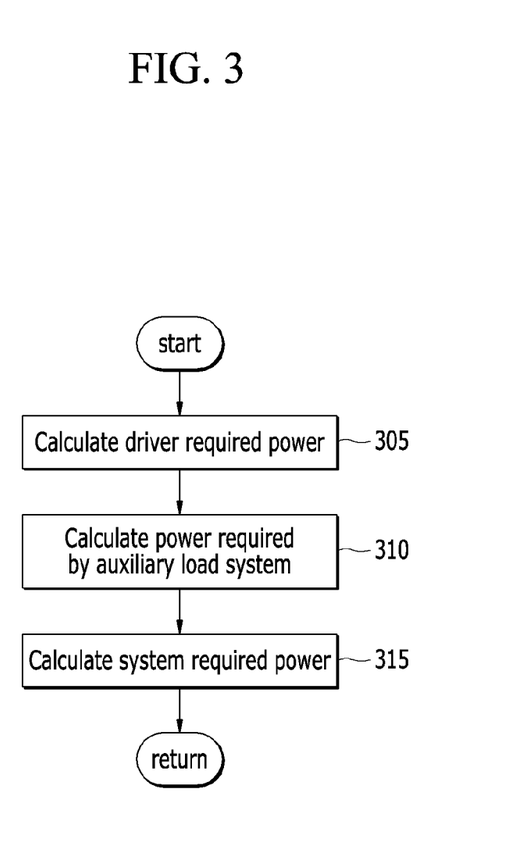
FIG. 3 is a flowchart illustrating a method of calculating system required power by a controller illustrated in FIG. 1 according to an exemplary embodiment of the present invention.

FIG. 3 is a flowchart illustrating a method of calculating system required power by the controller illustrated in FIG. 1. Referring to FIG. 3, in a first calculation step 305, driver required power may be calculated by the controller 155. In particular, the controller 155 may be configured to calculate driver required power in response to an acceleration pedal engagement amount signal output from the APS. The acceleration pedal amount signal may be a value that corresponds to an amount of pressure exerted onto the accelerator pedal by a driver. The driver required power (driver required output) may be a value obtained by multiplying a torque of the engine required by the driver and a rotation speed (or an RPM of the engine) required by the driver.

In another exemplary embodiment of the present invention, the controller 155 may be configured to calculate the driver required power in response to a cruise control request signal. The cruise control request signal may be generated by an input device of the hybrid vehicle 100 by the driver. The controller 155 may include a feedback control unit configured to execute cruise control. The feedback control unit may be configured to operate a device such as a throttle valve of the hybrid vehicle 100 to allow the driver to maintain a predetermined travelling speed. According to a second calculation step 310, power required by an auxiliary load device may be calculated by the controller 155 as represented in the equation below.

Auxiliary load device required power=consumed power of auxiliary load device×weighting factor Furthermore, the weighting factor (or weighted value) may be differently set by the controller 155 based on an SOC of the battery 105. In other words, the weighting factor value may be changed based on a value of an SOC of the battery 105. A weighted value when an SOC of the battery is relatively low (e.g., the SOC is about 50% or more and about 65% or less) may be set to be relatively large (e.g., about 1.3 or more and about 1.5 or less), to allow the required power of the auxiliary load device to be increased, and a weighted value when an SOC of the battery is relatively high (e.g., the SOC exceeds about 65% and is about 80% or less) may be set to be relatively small (e.g., about 0.5 or more and about 0.9 or less), to allow the required power of the auxiliary load device to be decreased. When the required power of the auxiliary load device is divided by a rotation speed (or RPM) of the engine required by the auxiliary load device, the required power of the auxiliary load device may be converted into required torque of the auxiliary load device.

According to a third calculation step 315, system required power (or system required torque) may be calculated by the controller 155. The system required power may be a value obtained by multiplying torque of the engine (system required torque) required by the system (device) of the hybrid vehicle 100 and a rotation speed (or an RPM) of the engine required by the system. The system required power may be a value used for changing a travelling mode to the HEV mode, and may be determined by a sum of the driver required power and the required power of the auxiliary load device.

Figure 4:
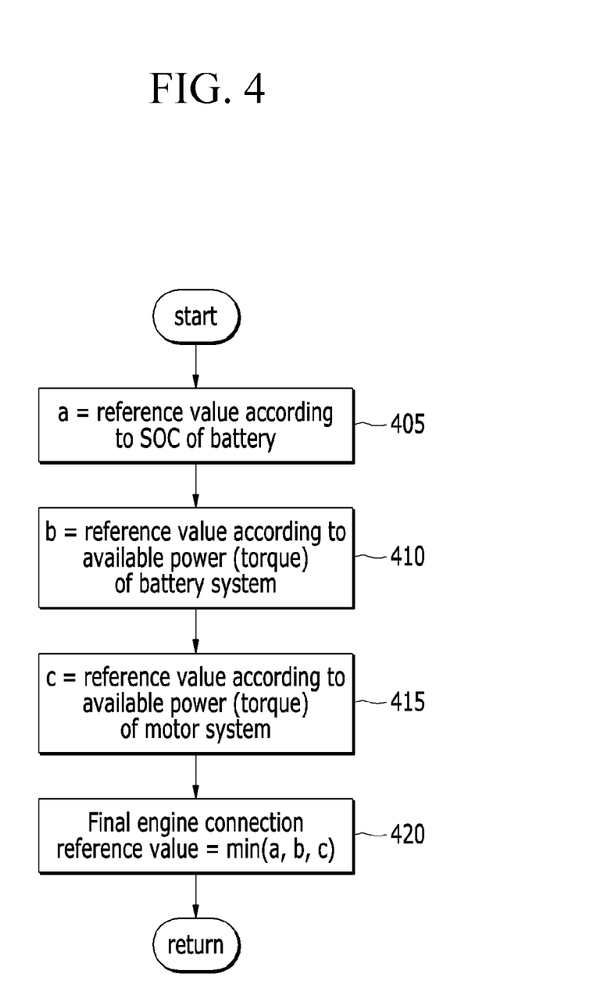
FIG. 4 is a flowchart illustrating an exemplary embodiment of a method of calculating a reference value by the controller illustrated in FIG. 1 according to an exemplary embodiment of the present invention.

FIG. 4 is a flowchart illustrating an exemplary embodiment of a method of calculating a reference value by the controller illustrated in FIG. 1. Referring to FIG. 4, the reference value based on the SOC of the battery may be set by the controller 155 in a first reference value setting step 405. More particularly, power when the SOC of the battery 105 configured to provide power to the device of the hybrid vehicle 100 maintains in the normal region may be set as first reference power a. The first reference power when the SOC of the battery 105 is relatively low (e.g., the SOC is about 50% or more and about 65% or less) may be set to be relatively small, and the first reference power when the SOC of the battery 105 is relatively high (e.g., the SOC exceeds about 65% and is about 80% or less) may be set to be relatively large. More particularly, a size of the first reference power may be changed based on a value of the SOC of the battery 105. When the SOC is low, an HEV mode transition reference is low, and thus, the HEV mode transition reference for connecting engine power may be decreased even with minimal system required power.

According to a second reference value setting step 410, a reference value may be set by the controller 155 based on available power of the battery system (or maximum available power of the battery system). The available power of the battery system may be set based on a temperature of the battery, an SOC of the battery, and a margin (e.g., a voltage margin) for protecting the battery based on a hardware specification of the battery 105. More particularly, the controller 155 may be configured to set power when the SOC of the battery 105 is maintained in the normal region within the available power of the battery system including the battery 105 as second reference power b. The battery system may include a battery management system (BMS) configured to monitor and manage a state of the battery or a temperature sensor configured to detect a temperature of the battery.

According to a third reference value setting step 415, a reference value based on maximum available power of the motor system may be set by the controller 155. The available power of the motor system may be set based on a temperature of the inverter connected to the motor and a margin (e.g., a voltage margin) for protecting the motor based on a hardware specification of the motor 135. More particularly, the controller 155 may be configured to set power when the SOC of the battery 105 is maintained in the normal region within the available power of the motor system including the driving motor 135 of the hybrid vehicle 100 configured to receive power from the battery 105 as third reference power c. The motor system may include the MCU and the inverter 110. According to a final reference value setting step 420, a minimum value among the first reference power, the second reference power, and the third reference power may be calculated (set) as reference power, which is a final engine connection reference value by the controller 155.

Figure 5:
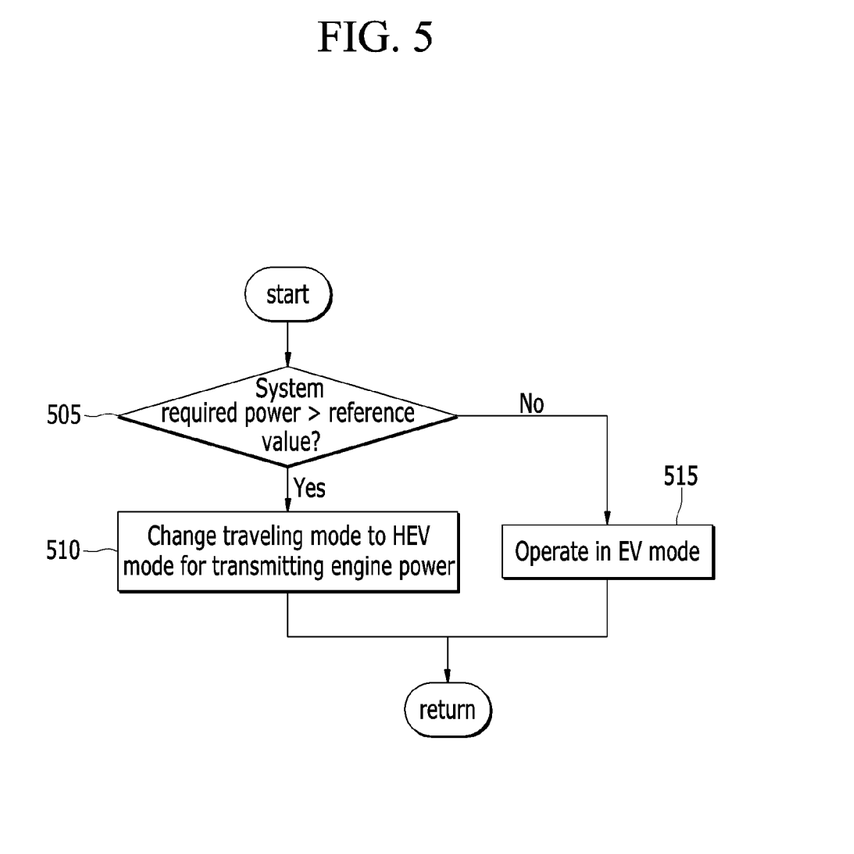
FIG. 5 is a flowchart illustrating a method of determining an HEV mode entrance by the controller illustrated in FIG. 1 according to an exemplary embodiment of the present invention.

FIG. 5 is a flowchart illustrating a method of determining an HEV mode entrance by the controller illustrated in FIG. 1. Referring to FIG. 5, in a comparison step 505, the controller 155 may be configured to compare the system required power with the reference power that is the reference value aforementioned in the description of FIG. 2 or FIG. 4. The method of determining the HEV mode entrance, which is a process when the system required power is greater than the reference value, may proceed to a mode changing step 510, and the process when the system required power is equal to or less than the reference value may proceed to an EV mode step 515.

According to the mode changing step 510, when the system required power is greater than the reference power, the controller 155 may be configured to adjust or change a travelling mode of the hybrid vehicle 100 from the EV mode to the HEV mode by operating the engine clutch 130 to be coupled. According to the EV mode step 515, when the system required power is equal to or less than the reference power, the controller 155 may be configured to maintain the travelling mode of the hybrid vehicle 100 in the EV mode. Accordingly, the hybrid vehicle 100 may be operated in the EV mode.

A method of controlling a change of a travelling mode of a hybrid vehicle according to an exemplary embodiment of the present invention will be described hereinafter with reference to FIGS. 1, 2, 3, 4, and 5. The method of controlling the change of the travelling mode of the hybrid vehicle may be applied to a hybrid vehicle including the apparatus for controlling the change of the travelling mode of the hybrid vehicle illustrated in FIG. 1. The method of controlling the change of the travelling mode of the hybrid vehicle may include a system required power calculating step, a reference power calculating step, and a change controlling step.

Referring to FIGS. 1 to 5, in the system required power calculating step, the controller 155 may be configured to calculate system required power required by a device mounted within the hybrid vehicle 100. The system required power may be a value obtained by adding driver required power and power required by an auxiliary load device of the hybrid vehicle 100. The controller 155 may then be configured to calculate the driver required power in response to an acceleration pedal engagement amount signal output from the APS. In another exemplary embodiment of the present invention, the controller 155 may be configured to calculate the driver required power in response to a cruise control request signal. The auxiliary load device may include a low voltage DC-DC converter, an air conditioner, or a heater. Power required by the auxiliary load device may be set by a value obtained by multiplying consumed power of the auxiliary load device by a weighting factor, and when an SOC of the battery 105 is low, the weighting factor may be set to be increased, and when the SOC of the battery 105 is high, the weighting factor may be set to be minimal.

According to the reference power calculating step, the controller 155 may be configured to calculate reference power. The reference power may be power when an SOC of the battery providing power to the device of the hybrid vehicle 100 is maintained in the normal region. In another exemplary embodiment, the controller 155 may be configured to set power when an SOC of a battery 105 configured to provide power to the device of the hybrid vehicle 100 is maintained in the normal region as first reference power, power when the SOC of the battery 105 is maintained in the normal region within available power of the battery system including the battery 105 as second reference power, and power when the SOC of the battery 105 is maintained in the normal region within available power of the motor system including the driving motor 135 of the hybrid vehicle 100 configured to receive electric power from the battery 105 as third reference power, and may be configured to set a minimum value among the first reference power, the second reference power, and the third reference power as the reference power. When the SOC of the battery 105 is low, the first reference power is set to be minimal, and when the SOC of the battery 105 is high, the first reference power is set to be large. According to the change controlling step, when the system required power is greater than the reference power, the controller 155 may be configured to adjust a travelling mode of the hybrid vehicle 100 from the EV mode to the HEV mode by operating the engine clutch 130 to be coupled.

As described above, the present invention may effectively manage the battery that is an electrical power source, and provide the control method for changing a travelling mode from the EV mode to the HEV mode. In the present invention, to change a travelling mode from the EV mode to the HEV mode, system required power (or system required torque) may be used instead of driver required power (or driver required torque. More particularly, in the present invention, a state of the battery or a state of the motor may be considered without considering an engine operation point when a reference value compared with system required power is set. In addition, it may be possible to prevent energy path loss (e.g., loss of energy efficiency according to an energy circulation performed by the engine, the battery, and the motor (driving motor)) by adjusting an SOC of the battery to be maintained in the normal region (e.g., about 50% or more and about 80% or less), thereby improving fuel efficiency of the hybrid vehicle.

A constituent element, a "~ unit", a block, or a module used in the present exemplary embodiment may be implemented by software, such as a task, a class, a subroutine, a process, an object, an execution thread, and a program, which is performed in a predetermined region of a memory, or by hardware, such as a field programmable gate array (FPGA) or an application-specific integrated circuit (ASIC), and further, may also be configured by a combination of the software and the hardware. The constituent, the "~ unit", or the like may also be included in a computer readable storage medium, or a part thereof may be dispersed and distributed in a plurality of computers.

As described above, the exemplary embodiment has been disclosed in the drawings and the specification. In particular, specific terms have been used, but are used for the purpose of describing the present invention, and are not used to limit a meaning or restrict the scope of the present invention described in the claims. Accordingly, those skilled in the art may understand that various modifications and equivalent exemplary embodiments may be made from the present invention. Accordingly, the technical protection scope of the present invention should be defined by the technical spirit of the accompanying claims.

DESCRIPTION OF SYMBOLS

105: Battery
110: Inverter
125: Engine
130: Engine clutch
135: Motor
155: Controller

What is claimed is:

1. A method of controlling a change of a travelling mode of a hybrid vehicle, comprising:
    calculating, by a controller, a system required power required by a device mounted within a hybrid vehicle;
    calculating, by the controller, a reference power; and
    adjusting, by the controller, a travelling mode of the hybrid vehicle from an electric vehicle (EV) mode to a hybrid electric vehicle (HEV) mode by operating an engine clutch disposed between an engine and a driving motor to be coupled when the system required power is greater than the reference power,
    wherein the system required power is a value obtained by adding a driver required power and a power required by an auxiliary load device of the hybrid vehicle,
    wherein the reference power is power when a state of charge (SOC) of the battery configured to provide power to the device of the hybrid vehicle is maintained in a normal region in which the state of charge of the battery is a first reference value or more and a second reference value or less in order to prevent loss of energy efficiency according to an energy circulation performed by the engine, the battery, and the driving motor, and
    wherein the power required by the auxiliary load device is set by a value obtained by multiplying consumed power of the auxiliary load device by a weighting factor, and when the SOC of the battery is lower than a threshold value, the weighting factor is set to be larger than a factor value, and when the SOC of the battery is higher than the threshold value, the weighting factor is set to be smaller than the factor value.

2. The method of claim 1, further comprising:
    calculating, by the controller, the driver required power in response to an acceleration pedal engagement amount signal output from an acceleration pedal sensor (APS).

3. The method of claim 1, further comprising:
    calculating, by the controller, the driver required power in response to a cruise control request signal.

4. The method of claim 1, wherein the auxiliary load device includes a low voltage direct current-direct current (DC-DC) converter, an air conditioner, or a heater.

5. A method of controlling a change of a travelling mode of a hybrid vehicle, comprising:
    calculating, by a controller, a system required power required by a device mounted within a hybrid vehicle;
    calculating, by the controller, a reference power; and
    adjusting, by the controller, a travelling mode of the hybrid vehicle from an electric vehicle (EV) mode to a hybrid electric vehicle (HEV) mode by operating an engine clutch to be connected when the system required power is greater than the reference power,
    wherein the system required power is a value obtained by adding a driver required power and a power required by an auxiliary load device of the hybrid vehicle, and
    wherein the calculation of the reference power includes:
        setting, by the controller, power when a state of charge (SOC) of a battery configured to provide power to the device of the hybrid vehicle is maintained in a normal region in which the state of charge of the battery is a first reference value or more and a second reference value or less in order to prevent loss of energy efficiency according to an energy circulation performed by the engine, the battery, and the driving motor, as first reference power;
        setting, by the controller, power when the SOC of the battery set based on available power of a battery system including the battery is maintained in the normal region as second reference power;
        setting, by the controller, power when the SOC of the battery set based on available power of a motor system including the driving motor of the hybrid vehicle configured to receive power from the battery is maintained in the normal region as third reference power; and
        setting, by the controller, a minimum value among the first reference power, the second reference power, and the third reference power as the reference power.

6. The method of claim 5, wherein when the SOC of the battery is lower than a threshold value, the first reference power is set to be smaller than a power value, and when the SOC of the battery is higher than the threshold value, the first reference power is set to be larger than the power value.

7. An apparatus for controlling a change of a travelling mode of a hybrid vehicle, comprising:
    an acceleration pedal sensor (APS) configured to detect a pedal engagement amount of an acceleration pedal; and
    a controller configured to calculate system required power that is a value obtained by adding a driver required power required by a device mounted within a hybrid vehicle and a power required by an auxiliary load device of the hybrid vehicle, and calculate reference power that is power when a state of charge (SOC) of a battery configured to provide power to a system of the hybrid vehicle is maintained in a normal region in which the state of charge of the battery is a first reference value or more and a second reference value or less in order to prevent loss of energy efficiency according to an energy circulation performed by the engine, the battery, and the driving motor, wherein the controller is configured to adjust a travelling mode of the hybrid vehicle from an electric vehicle (EV) mode to a hybrid electric vehicle (HEV) mode by operating an engine clutch to be connected in response to determining that the system required power is greater than the reference power, wherein the controller is configured to calculate the driver required power in response to an acceleration pedal engagement amount signal, wherein the controller is configured to set power when a state of charge (SOC) of a battery configured to provide power to the device of the hybrid vehicle is maintained in the normal region as first reference power, wherein the controller is configured to set power when the SOC of the battery set based on available power of a battery system including the battery is maintained in the normal region as second reference power, wherein the controller is configured to set power when the SOC of the battery set based on available power of a motor system including the driving motor of the hybrid vehicle configured to receive power from the battery is maintained in the normal region as third reference power, and wherein the controller is configured to set a minimum value among the first reference power, the second reference power, and the third reference power as the reference power.

8. The apparatus of claim 7, wherein when the SOC of the battery is lower than a threshold value, the first reference power is set to be smaller than a power value, and when the SOC of the battery is higher than the threshold value, the first reference power is set to be larger than the power value.

* * * * *